United States Patent [19]
Dhuey

[11] Patent Number: 5,758,130
[45] Date of Patent: May 26, 1998

[54] DIGITAL SIGNAL DISTRIBUTION FOR LONG AND SHORT PATHS

[75] Inventor: Michael J. Dhuey, Cupertino, Calif.

[73] Assignee: Apple Computer, Inc., Cupertino, Calif.

[21] Appl. No.: 511,424

[22] Filed: Aug. 4, 1995

[51] Int. Cl.$^6$ .................................................. G06F 1/12
[52] U.S. Cl. .................................................. 395/552
[58] Field of Search ........................ 395/550, 552, 395/558; 326/93; 327/152, 153, 161, 150

[56] References Cited

U.S. PATENT DOCUMENTS

| | | | |
|---|---|---|---|
| 4,295,220 | 10/1981 | Blum et al. | 371/61 |
| 4,580,243 | 4/1986 | Renner et al. | 395/552 |
| 5,150,066 | 9/1992 | Butel et al. | |
| 5,258,659 | 11/1993 | Kannegundla | |
| 5,258,660 | 11/1993 | Nelson et al. | 307/269 |
| 5,408,641 | 4/1995 | Gagliardo et al. | 395/552 |
| 5,414,832 | 5/1995 | Denneau et al. | 395/552 |
| 5,465,347 | 11/1995 | Chao et al. | 395/550 |
| 5,475,690 | 12/1995 | Burns et al. | 395/550 X |

*Primary Examiner*—Thomas M. Heckler
*Attorney, Agent, or Firm*—David J. Larwood

[57] ABSTRACT

A signal delay apparatus delivers synchronous signals over long and short traces. For a signal that needs to be delayed because it will be carried on a relatively short trace, passing the signal through a clocked device such as a flip flop will delay the output by a selected number of clocks. If a relatively longer trace is longer than the shorter trace by the distance a signal travels during the selected number of clock cycles, then clock signals over the respective paths will be synchronized. In a preferred embodiment, the signals are clock signals from a clock generator.

6 Claims, 1 Drawing Sheet

DIGITAL SIGNAL DISTRIBUTION FOR LONG AND SHORT PATHS

FIELD OF THE INVENTION

The invention relates to generating synchronized signals for delivery to electronic parts on a printed circuit board where the parts may be widely separated. This invention is particularly useful for a clock generator where certain clock signals are used very close to a clock generator and other signals are used at some distance from the clock generator.

BACKGROUND OF THE INVENTION

Many modern electronic devices include multiple components that need to be synchronized. One common system is a computer motherboard, a printed circuit board, with several ASICs secured to the motherboard, where each ASIC performs one or more functions to support the system. The actions of various components are typically coordinated and synchronized in part through one or more system clock signals.

A system typically includes a primary clock generator. In some instances, there may be one or more secondary clock generators which is driven by the primary clock generator. This may arise when a large number of clock signals are needed.

In many systems, a variety of clock signals may be provided. In addition to a system bus clock, many systems include a processor clock, which may be different than the system bus clock. Other clocks may be required for coordination of certain system functions. /PClkEn and /BClkEn are examples of two other clock signals that may be useful in certain applications for a PowerPC™ 601 (PPC 601, from Motorola or IBM).

2×PClk, or Two times Processor Clock, is a high frequency (up to 300 MHz) output which clocks the PPC 601. This signal is delayed one half 2×PClk period relative to the BClkx signals. The rising edge is used to sample inputs to PPC 601 except /PClkEn and /BClkEn which are sampled on the falling edge. The duty cycle for this signal is always 50% but the frequency may be varied under system control.

/BClkEn, or Bus Clock Enable, is an active low signal which is sampled by the falling edge of 2×PClk. This signal is delayed one half 2×PClk period relative to the BClkx signals. When /PClkEn and /BClkEn are sampled low at the falling edge of 2×PClk the next rising edge of 2×PClk is the input and or output reference clock for the PPC 601 bus. The duty cycle of this signal may be varied under system control.

/PClkEn, or Processor Clock Enable, is an active low signal which is sampled by the falling edge of 2×PClk. This signal is delayed one half 2×PClk period relative to the BClkx signals. When /PClkEn is sampled low at the falling edge of 2×PClk the next rising edge will advance the processor clock. The duty cycle for this signal is always 50% but the frequency may be varied under system control.

BClk0-BClk5, or Bus Clock, is the bus clock signal repeated on 6 pins. The rising edge coincides with the rising 2×PClk edge which follows a falling 2×PClk edge with /PClkEn and /BClkEn low. The duty cycle for this signal is always 50% but the frequency may be varied under system control.

In many instances, the primary system clock is repeated and distributed to ASICs on various portions of a PCB. Referring to FIG. 2, clock generator 11 is connected by bus clock lines 104, BClk2, BClk3, BClk4 and BClk5, to various ASICs 16, 14, 15 and 13 respectively. Each of these ASICs are positioned on the PCB according to a variety of design constraints and tradeoffs.

In general, the lengths of each bus clock line 104 are not identical if simply routed along the most efficient path to each corresponding ASIC. However, if the effective lengths (considering also impedance) of each bus clock line 104 are not electrically identical, then clock signals which are synchronized at the edge of clock generator 11 will not reach the corresponding ASICs at the same time. This can lead to some significant operational difficulties. Design engineers go to considerable effort to design bus clock lines of approximately equal effective lengths so that the various ASICs are clocked synchronously. This may entail routing a bus clock line over a longer than otherwise logical path, or may entail inclusion of active or passive devices to synchronize clocking of the various ASICs.

The situation is complicated where certain devices are quite close to the clock generator chip. It is frequently advantageous to put the processor quite close to the clock generator. This is true for the PPC 601 where the PPC 601 requires several different clock signals. This is particularly true when some of the special clock signals carry higher frequency signals, such as 2×PClk. By keeping high frequency traces short, extraneous radiation can be minimized.

Synchronizing signals over very short traces and very long traces has been particularly problematic in the past. The present invention provides a useful way to provide synchronous signals over traces of varying lengths.

SUMMARY OF THE INVENTION

The present invention provides a signal delay to deliver synchronous signals over long and short traces. For a signal that needs to be delayed because it will be carried on a relatively short trace, passing the signal through a clocked device will delay the output by a selected number of clocks. In a preferred implementation, the signal is passed through a flip flop and thereby delayed by one clock cycle. If a relatively longer trace is longer than the shorter trace by the distance a signal travels during one clock cycle, then clock signals over the respective paths will be synchronized. In a preferred embodiment, the signals are clock signals from a clock generator.

One object of this invention is to provide a signal delay to allow synchronous delivery of signals over a short signal path when compared to non-delayed signals over a longer path.

This and other objects and advantages of the invention, as well as the details of an illustrative embodiment, will be more fully understood from the following specification and drawings.

DETAILED DESCRIPTION OF THE INVENTION

Figure 1:
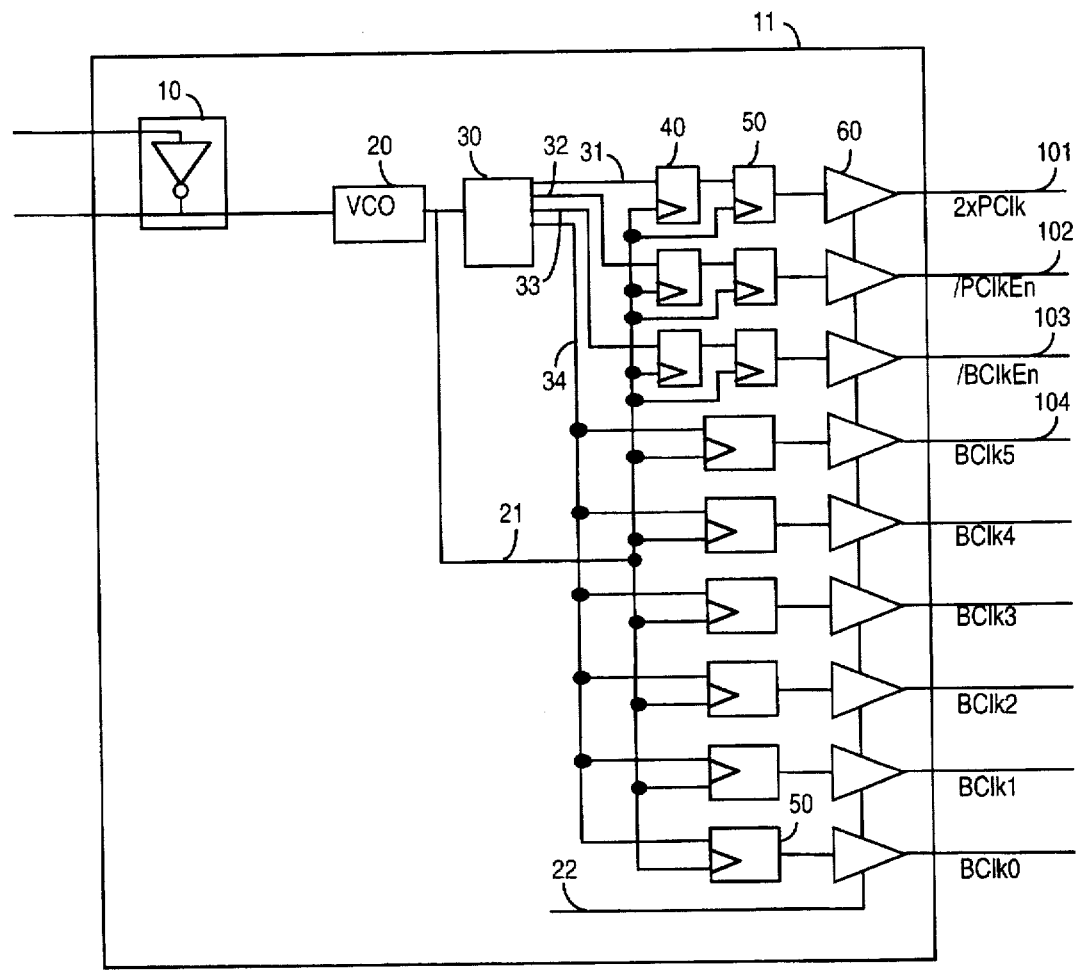
FIG. 1 illustrates internal circuitry of a clock distribution device.

Referring to FIG. 1, one useful way to deliver synchronous copies of a clock signal is to clock out the clock signal. A crystal 10 drives voltage controlled oscillator 20 to deliver a selected output, an internal reference clock signal used within the clock generator 11. This reference clock signal is used in clock controller 30 to set up various clock signals with relative frequencies, duty cycles, and phasing as required by the system. Some of these timing requirements are described above for one set of signals for a PPC 601 processor and system bus. Clock controller 30 outputs signals 31, 32, 33 and 34 corresponding to 2×PClk 101, PClkEn 102, BClkEn 103, and BClk0... BClk5 104, respectively.

Figure 2:
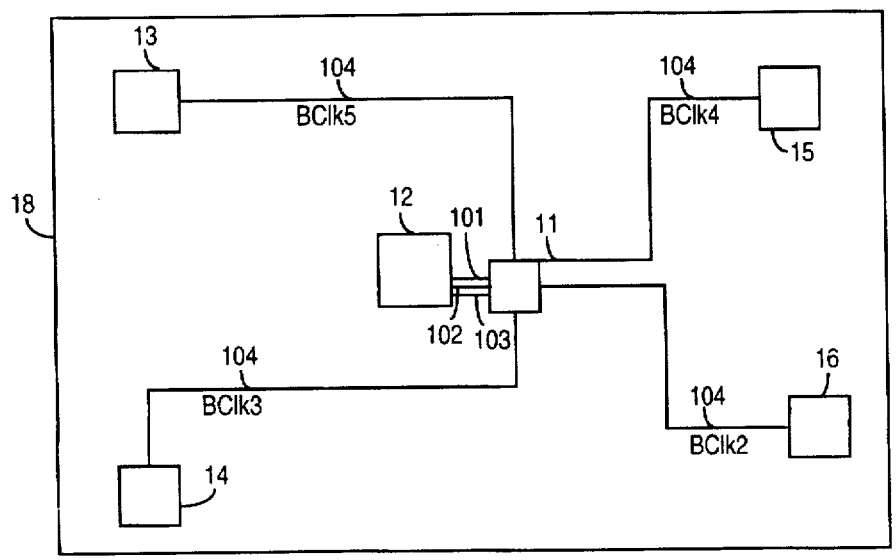
FIG. 2 illustrates a circuit board and some of the ASICs that might be connected to a clock distribution device.

As part of clock generator 11, flip flops 50 for bus clock outputs BClk0, BClk1, BClk5 are connected with "D" inputs 34, an output from clock controller 30. The 10 flip flops 50 are enabled by a copy of the reference clock signal on line 21, and each output is passed through a driver 60 and on to the edge of the chip. As shown in FIG. 2, these BClk signals can be distributed to relatively distant components on a PCB. Drivers 60 can be disabled by a signal on line 22.

However, signals delivered over short traces, such as 2×PClk 101, PClkEn 102 and BClkEn 103 from clock generator 11 to processor 12, would arrive too soon if delivered in the same manner as BClk signals. Within clock generator 11, these signals are delayed by adding an additional flip flop 40 in the path of each signal. Each flip flop 40 is connected with a D input selected from 31, 32 or 33 and enabled by a copy of the reference clock signal on line 21. The output of each flip flop 40 is passed to a flip flop 50, also enabled by a copy of the reference clock signal on line 21. The output of each flip flop 50 is passed through a driver 60 and on to the edge of the chip to deliver the corresponding signals as shown. At the edge of the chip, then, signals 2×PClk 101, PClkEn 102 and BClkEn 103 are one clock behind corresponding BClk signals.

In one preferred implementation, the following clock delays result:

| VCO Freq. | 2xPClk (MHz) | Delay (ns) |
| --- | --- | --- |
| 533.33 (divided in clock controller) | 133.33 | 3.750 |
| 320 | 160 | 3.125 |
| 400 | 200 | 2.500 |
| 480 | 240 | 2.083 |
| 533.333 | 266.66 | 1.875 |
| 600 | 300 | 1.666 |

This delay is compensated in trace length for the BClk signals. One skilled in the art can readily design a path that requires a specified amount of time for a signal to traverse.

Depending on the frequencies at which the system may be driven, a path length can be chosen that will accommodate more than one frequency, as recognized by one skilled in the art. One system that can be used with the present invention is disclosed in a copending, commonly assigned application, SLEEP MODE CONTROLLER FOR POWER MANAGEMENT, Inventor Michael Dhuey, Ser. No. 08/511,158, filed on Aug. 4, 1995, which is incorporated herein in full by reference.

In a preferred embodiment, the delay device is a flip flop, but one skilled in the art will recognize other useful delay mechanisms. In general, it is preferred that the delay device be a clocked device so that an electronic device can be manufactured with a predictable delay. Other delay devices such as gate delays or transmission lines may be subject to unpredictable process variation during manufacturing and operation, with sensitivities to manufacturing process conditions or to operating conditions such as temperature. A clocked delay device can be synchronized easily with other signals in the system without undue sensitivity to operating or manufacturing process conditions.

The present invention is particularly useful in a clock generator circuit. However, one skilled in the art will recognize that the teachings of this invention may be useful for other signal synchronization needs, for example in certain buses connecting various devices on a PCB, such as memory to processor, memory to cache, memory to secondary bus.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

I claim:

1. A signal synchronization apparatus for transmitting signals over varying paths, comprising:

a first signal controller for delivering a first signal with known timing characteristics, a first signal path, a first signal destination at a destination end of said first signal path, a second signal controller for delivering a second signal with known timing characteristics, a second signal path, shorter than said first signal path, a second signal destination at a destination end of said second signal path, a digital signal delay in the path for said second signal, said digital signal delay selected to synchronize the delivery of said second signal at said second signal destination and the delivery of said first signal at said first signal destination within a selected tolerance, whereby a first signal on said first signal path and a second signal on said second signal path will be delivered synchronously.

2. The signal synchronization apparatus of claim 1 wherein said first signal and said second signal are clock signals.

3. The signal synchronization apparatus of claim 1 wherein said digital signal delay is a flip flop.

4. A method for providing synchronized signals within a digital apparatus, said method comprising delivering over a first signal path to a first signal destination a first signal with known timing characteristics, delivering over a second signal path to a second signal destination a second signal with known timing characteristics, said second signal path shorter than said first signal path, including in said second signal path a digital signal delay, said digital signal delay selected to synchronize the delivery of said second signal at said second signal destination and the delivery of said first signal at said first signal destination within a selected tolerance, whereby a first signal on said first signal path and a second signal on said second signal path will be delivered synchronously.

5. The method of claim 4 wherein said first signal and said second signal are clock signals.

6. The method of claim 4 wherein said digital signal delay is provided by a flip flop.

* * * * *